(12) United States Patent
Choi et al.

(10) Patent No.: US 8,200,490 B2
(45) Date of Patent: Jun. 12, 2012

(54) METHOD AND APPARATUS FOR SEARCHING MULTIMEDIA DATA USING SPEECH RECOGNITION IN MOBILE DEVICE

(75) Inventors: In Jeong Choi, Hwaseong-si (KR); Nam Hoon Kim, Suwon-si (KR); Ick Sano Han, Yongin-si (KR); Sang Bae Jeong, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1032 days.

(21) Appl. No.: 11/704,271

(22) Filed: Feb. 9, 2007

(65) Prior Publication Data

US 2007/0208561 A1  Sep. 6, 2007

(30) Foreign Application Priority Data

Mar. 2, 2006  (KR) .................. 10-2006-0020089

(51) Int. Cl.
*G10L 15/04* (2006.01)
*G06F 7/00* (2006.01)
*G06F 17/30* (2006.01)

(52) U.S. Cl. ........ 704/252; 704/254; 707/758; 707/759; 707/760; 707/769

(58) Field of Classification Search .................. None
See application file for complete search history.

(56) References Cited

U.S. PATENT DOCUMENTS

| 6,073,095 | A  | * | 6/2000  | Dharanipragada et al. ... 704/242 |
| 6,397,181 | B1 | * | 5/2002  | Li et al. ..................... 704/256.4 |
| 7,054,812 | B2 | * | 5/2006  | Charlesworth et al. ....... 704/251 |
| 7,263,484 | B1 | * | 8/2007  | Cardillo et al. ............... 704/236 |
| 7,401,019 | B2 | * | 7/2008  | Seide et al. .................... 704/254 |
| 7,488,886 | B2 | * | 2/2009  | Kemp .............................. 84/609 |
| 7,831,425 | B2 | * | 11/2010 | Acero et al. .................. 704/251 |
| 7,983,915 | B2 | * | 7/2011  | Knight et al. ................. 704/254 |
| 2004/0024599 | A1 | * | 2/2004 | Deisher ......................... 704/256 |
| 2004/0064306 | A1 |   | 4/2004 | Wolf et al. .................... 704/201 |
| 2004/0193427 | A1 |   | 9/2004 | Kurganov et al. ............ 704/275 |
| 2006/0047647 | A1 | * | 3/2006 | Kuboyama et al. .............. 707/4 |
| 2006/0074898 | A1 | * | 4/2006 | Gavalda et al. ................... 707/4 |
| 2008/0126089 | A1 | * | 5/2008 | Printz et al. ................... 704/235 |

FOREIGN PATENT DOCUMENTS

| JP | 2000-200084 | 7/2000 |
| JP | 2004-21233 | 1/2004 |
| JP | 2005-078705 | 3/2005 |
| KR | 10-1998-0000037 | 3/1998 |
| KR | 10-2005-0003814 | 1/2005 |
| KR | 10-2005-0053903 | 6/2005 |

OTHER PUBLICATIONS

Ordelman, Roeland J. F. et al., "Speech Recognition for Dutch Spoken Document Retrieval", CBMI '01, Brescia, Italy, Sep. 2001.
Goto, M. et al., Speech-Recognition Interfaces for Music Information Retrieval: "Speech Completion" and "Speech Spotter", Proceedings of the International Conference on Music Information Retrieval (ISMIR 2004), pp. 403-408, Oct. 2004.

* cited by examiner

*Primary Examiner* — Matthew Sked
(74) *Attorney, Agent, or Firm* — Staas & Halsey LLP (57) ABSTRACT

A method of searching music using speech recognition in a mobile device, the method including: recognizing a speech signal uttered by a user as a phoneme sequence; and searching music information by performing partial symbol matching between the recognized phoneme sequence and a standard pronunciation sequence.

22 Claims, 6 Drawing Sheets

| | ~ | _ | !ENTER | !EXIT | : | aa0 | aa1 |
|---|---|---|---|---|---|---|---|
| aa | -2.0731 | -9.8901 | -8.7897 | -8.7897 | -9.6628 | -1.3112 | -0.48 |
| aar | -1.7963 | -9.8901 | -8.7897 | -8.7897 | -9.6628 | -3.8501 | -4.573 |
| ae | -1.5674 | -9.8901 | -8.7897 | -8.7897 | -9.6628 | -4.9488 | -4.0134 |
| ah | -2.144 | -9.8901 | -8.7897 | -8.7897 | -9.6628 | -2.5509 | -2.9975 |

METHOD AND APPARATUS FOR SEARCHING MULTIMEDIA DATA USING SPEECH RECOGNITION IN MOBILE DEVICE

CROSS-REFERENCE TO RELATED APPLICATION

This application claims priority from Korean Patent Application No. 10-2006-0020089, filed on Mar. 2, 2006, in the Korean Intellectual Property Office, the disclosure of which is incorporated herein by reference.

BACKGROUND OF THE INVENTION

1. Field of the Invention

The present invention relates to a method and apparatus for searching multimedia data by a partial matching though a part of partial information of the multimedia data, such as a title of music, a name of a singer, or a playlist, in a mobile device.

2. Description of Related Art

As an example of conventional methods of searching and replaying programs using speech recognition, in U.S. Patent Publication No. 2004/0064306, Mitsubishi Electric discloses a voice activated music playback system in which speech of a user is latticed into phonemes, a text query is generated by the phonemes, a playback list is searched by using the generated text, and a music search is performed by using a music sample. However, this conventional method of searching and replaying programs using speech recognition is not always precise and language portability when converting the phoneme lattice into the text query can be difficult.

Conversely, as an example of conventional methods of searching music by using speech recognition in a hard disk drive type navigation apparatus, a playback device and program is disclosed in Japanese Patent Laid-Open Publication No. 2005-078705, in which music is searched by speech recognition by registering recognition words with respect to a name of a singer, a name of an album, and a music title and a result of the searching is displayed by considering whether the result is matched with each category such as the name of a singer, the name of an album, and the music title and a type of category. However, conventional methods of searching music by speech recognition require that a user precisely know a name of a singer, a name of an album, or a music title to conduct a search.

In the conventional methods of searching music by speech recognition described above, when a problem of conversion of a text query occurs or a user does not precisely know music information, music search is not acceptably performed.

Accordingly, a method of searching desired multimedia data such as music by using a partial speech associated with the desired multimedia data, which is inputted from a user to a mobile device, is seriously required.

BRIEF SUMMARY

An aspect of the present invention provides a method and apparatus for searching multimedia data, such as music in a mobile device, by recognizing a part or an entire utterance of a music title, a name of a singer, and a name of an album via a partial symbol matching between a recognized phoneme sequence and a standard pronunciation sequence.

An aspect of the present invention also provides a music information search method and apparatus capable of performing a function of converting music information used in speech recognition from a program list in a site for storing or downloading music, or in a mobile device itself.

An aspect of the present invention also provides a music information search method and apparatus capable of increasing precision of a match by applying linguistic constraints via a partial symbol matching process.

An aspect of the present invention also provides a music information search method and apparatus searching for a partial match score and a matched part between a phoneme recognition result and a vocabulary pronunciation sequence by using a phoneme confusion matrix.

According to an aspect of the present invention, there is provided a method of searching music using speech recognition in a mobile device, the method including: recognizing as a phoneme sequence a speech signal uttered by a user; and searching music information by performing partial symbol matching between the recognized phoneme sequence and a standard pronunciation sequence.

According to another aspect of the present invention, there is provided a music search apparatus including: a music database storing a pronunciation dictionary with respect to music and music information; a phoneme decoding unit decoding a speech signal into a candidate phoneme sequence; a matching unit matching the candidate phoneme sequence with a reference phoneme pattern in the pronunciation dictionary with respect to the music information; a calculation unit calculating a match score according to a result of the matching; and a display unit displaying a music information search result according to the calculated match score.

According to another aspect of the present invention, there is provided a music search apparatus, including: a feature extraction unit extracting a feature vector sequence of a speech signal of an input speech query; a phoneme decoding unit decoding the extracted feature vector sequence into at least one candidate phoneme sequences; a matching unit partially matching a candidate phoneme sequence with a reference pattern included in a stored lexicon by matching the candidate phoneme sequence with the reference pattern using a phoneme confusion matrix and linguistic constraints and, after the partial matching, matching a converted pronunciation sequence with a reference phoneme pattern of the lexicon so as to overcome an inconsistency due to a difference in pronunciation caused by palatalization; and a calculation unit calculating a match score according to the match score using a probability value of the phoneme confusion matrix and considering probabilities of insertion and deletion of the phoneme.

According to another aspect of the present invention, there is provided a computer-readable recording medium in which a program for executing the aforementioned method is recorded.

Additional aspects and/or advantages of the invention will be set forth in part in the description which follows and, in part, will be apparent from the description, or may be learned by practice of the invention.

BRIEF DESCRIPTION OF THE DRAWINGS

The above and/or other aspects and advantages of the present invention will become apparent and more readily appreciated from the following detailed description, taken in conjunction with the accompanying drawings of which.

DETAILED DESCRIPTION OF EMBODIMENTS

Reference will now be made in detail to the embodiments of the present invention, examples of which are illustrated in the accompanying drawings, wherein like reference numerals refer to the like elements throughout. The embodiments are described below to explain the present invention by referring to the figures.

Figure 1:
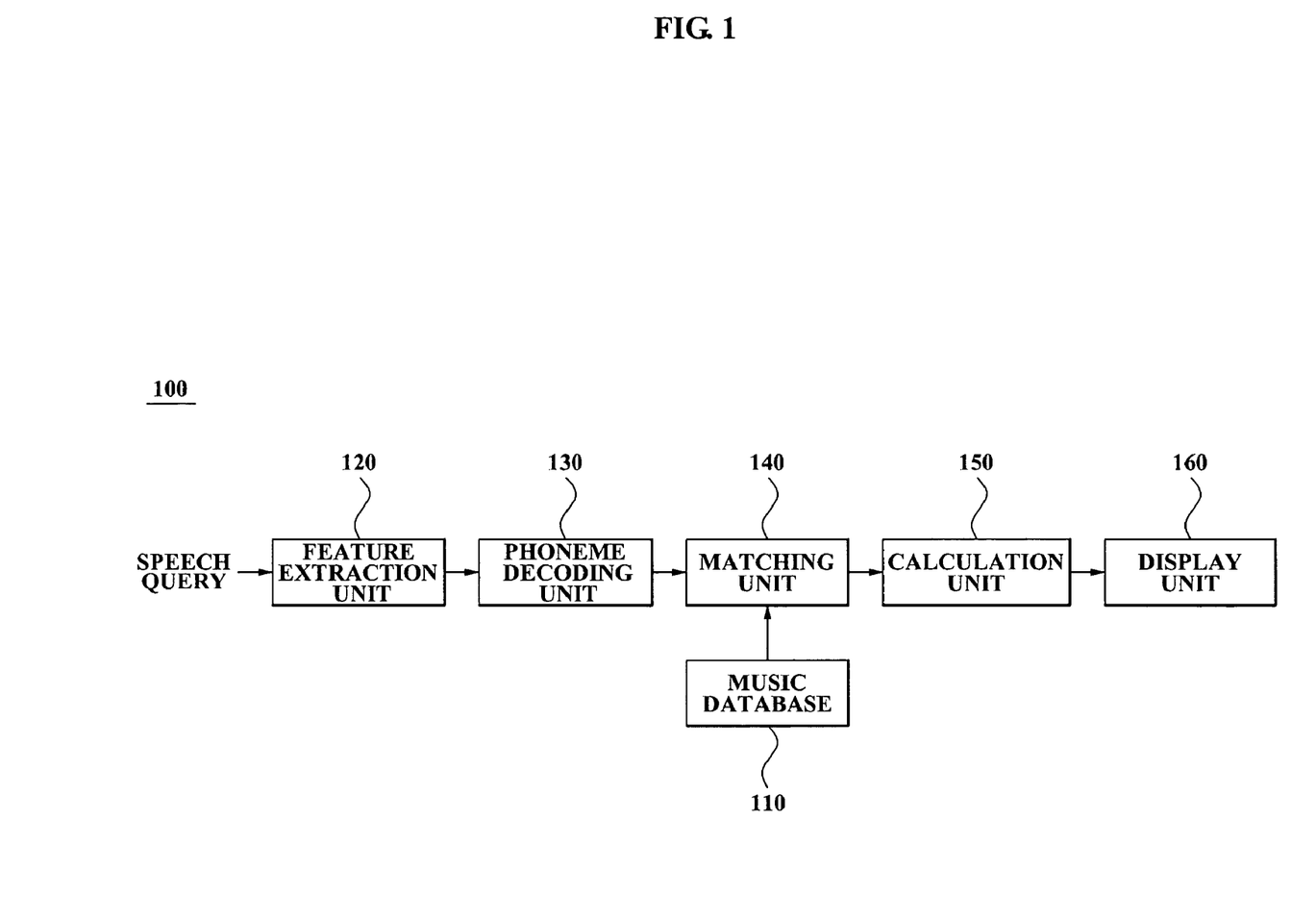
FIG. 1 is a diagram illustrating a configuration of a music search apparatus according to an embodiment of the present invention.

FIG. 1 is a diagram illustrating a configuration of a music search apparatus 100 according to an embodiment of the present invention.

Referring to FIG. 1, the music search apparatus 100 includes a music database 110, a feature extraction unit 120, a phoneme decoding unit 130, a matching unit 140, a calculation unit 150, and a display unit 160.

The music database 110 stores music, music information, and a lexicon for the music information. Non-limiting examples of the music information include various kinds of information associated with music, such as a name of a singer, a music title, a name of an album, a playlist, and a genre. A lexicon is a reference pronunciation pattern for comparing an input speech query with a recognized phoneme sequence.

The feature extraction unit 120 extracts a feature vector of a speech signal of an input speech query for searching music. Specifically, the feature extraction unit 120 reduces background noise of the speech signal of the input speech query, extracts a speech interval from the speech signal, and extracts a feature vector sequence to be used in speech recognition from the detected speech interval.

The phoneme decoding unit 130 decodes the extracted feature vector sequence into N candidate phoneme sequences. Specifically, the phoneme decoding unit 130 decodes the extracted feature vector sequence into the N candidate phoneme sequences by using a phoneme or a tri-phoneme acoustic model. Also, the phoneme decoding unit 130 applies a phoneme-level grammar when converting the extracted feature vector sequence into the N candidate phoneme sequences. Further, the phoneme decoding unit 130 may apply connectivity between contexts when using the tri-phoneme acoustic model.

Figure 3:
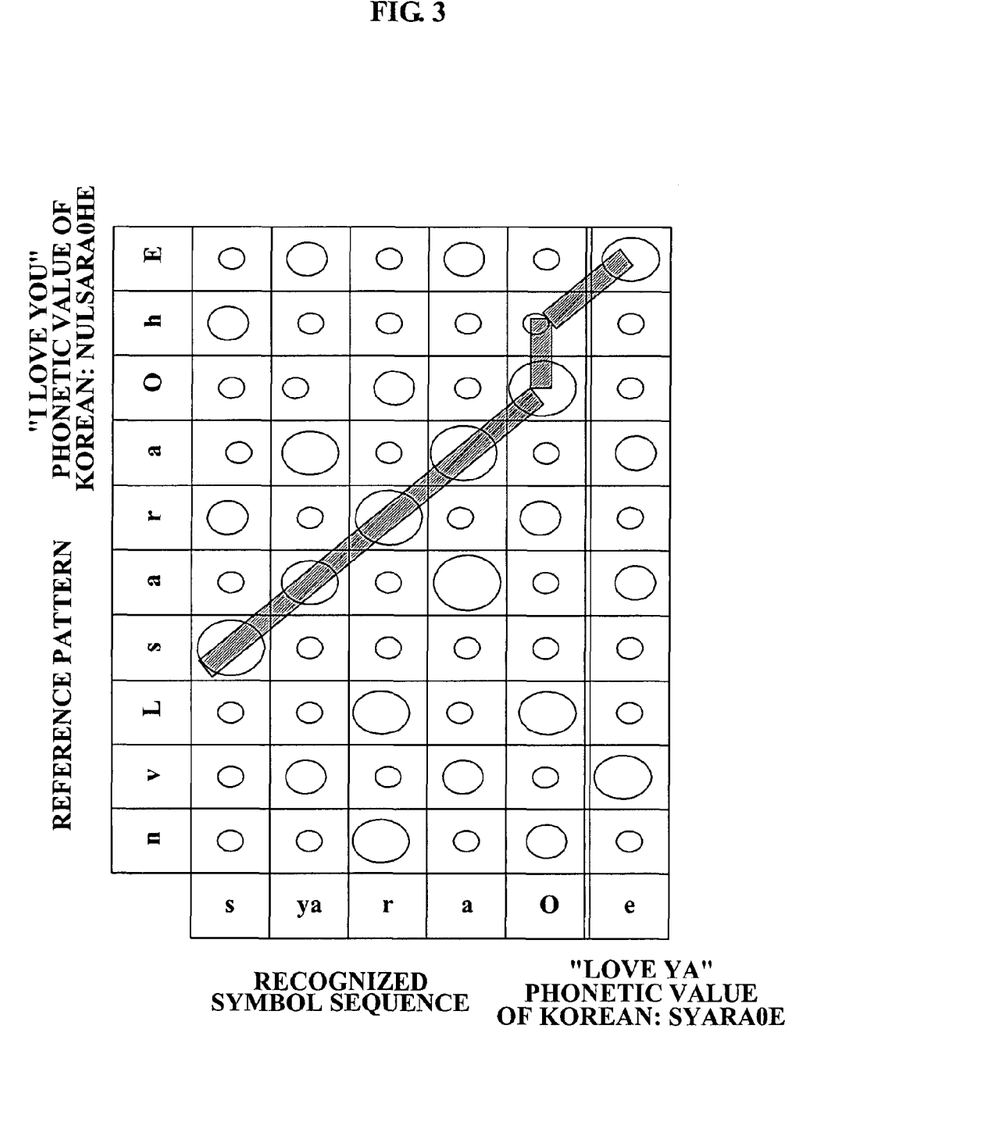
FIG. 3 is a diagram illustrating an example of a match of a reference pattern and a recognized symbol sequence by the matching unit of the music search apparatus of FIG. 1.

The matching unit 140 matches a candidate phoneme sequence with a reference pattern included in the lexicon stored in the music database 110 based on a dynamic programming method. Specifically, the matching unit 140 matches the recognized candidate phoneme sequence with the reference pattern by using a phoneme confusion matrix and linguistic constraints, with respect to an optimal path search. An example of this matching is illustrated in FIG. 3.

Also, the matching unit 140 may enable the match to be initiated or terminated at any point and may limit a start or an end of the match based on a word or a divided word.

For example, when a music title is "song of moonlight" whose phonetic values of Korean are dal bbich e no re, the music title is stored in the lexicon as D A L* B B I C H E N O R E. A part of the music title "dal bbich" corresponding to "moonlight" is registered in the lexicon as "D A L* B B I T*". In this case, a symbol of * indicates a final phoneme. When partially matching "dal bbich" of an entire pronunciation with "D A L B B I T" of a partial title, "T" is uttered as "ch" due to the phenomenon of palatalization, thereby generating an inconsistency between final phonemes.

After this partial matching, the matching unit 140 performs a detailed match to overcome pronunciation inconsistencies caused by palatalization.

Specifically, after performing the partial matching, the matching unit 140 converts a pronunciation sequence of the part of the candidate phoneme sequence exhibiting an effect of palatalization into an original pronunciation sequence in an isolated speech form, and performs the detailed match of the converted pronunciation sequence with a reference phoneme pattern of the lexicon. The conversion into the original pronunciation sequence enables regularization by back-tracking from a pronunciation rule.

The calculation unit 150 calculates a match score according to the match result. Specifically, the calculation unit 150 calculates the match score according to the match result by using a probability value of the phoneme confusion matrix. Also, the calculation unit 150 calculates the match score by considering probabilities of insertion and deletion of the phoneme.

Figure 5:
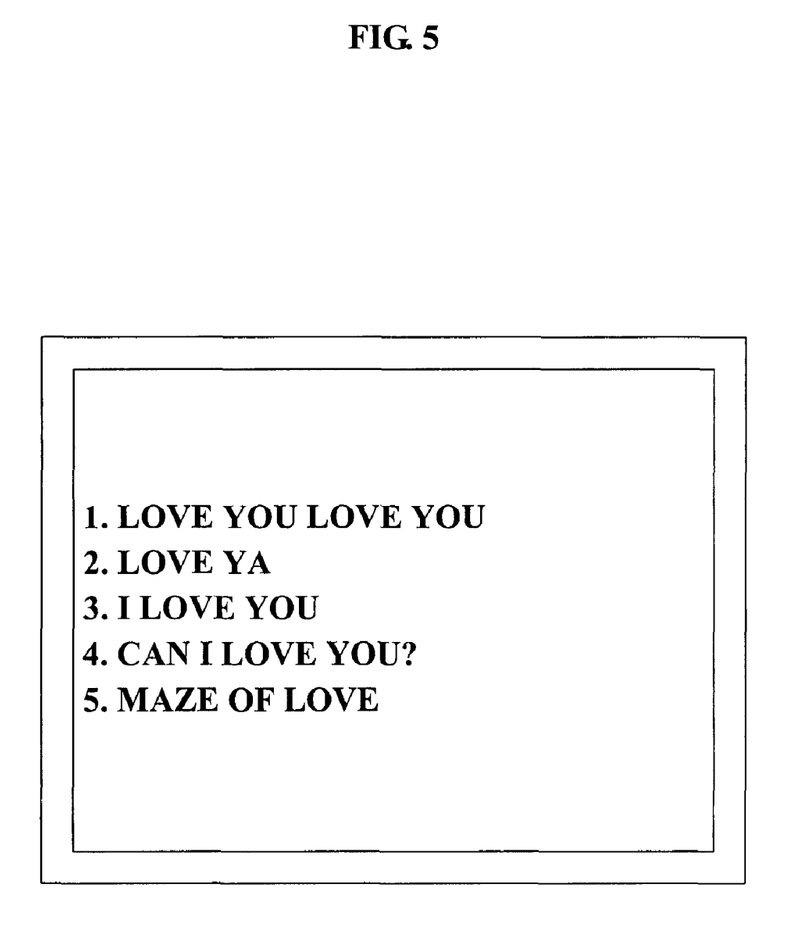
FIG. 5 is a diagram illustrating an example of display of a music information search result by the display unit of the music search apparatus of FIG. 1.

The display unit 160 displays a music information search result according to the calculated match score as shown in FIG. 5. The display unit 160 displays only a music information search result with a calculated match score greater than a predetermined reference value.

Also, when match scores of music information search results are the same, the display unit 160 arranges and displays the music information search results according to a predetermined priority. This priority may be, by way of non-limiting examples, a condition such as a type of a list, longest coincidence, and left-side coincidence. When the priority is of the type of a list, an order of a music title, a name of an album, a name of a singer, and music information may be determined by a user, or may be predetermined. When the priority is of the longest coincidence, matched contents that are long have priority. When the priority is of the left-side coincidence, the matched content located from the left-side has priority.

Also, the display unit 160 may display the music information search result by a different icon according to type, for each list. Specifically, when the music information search result is, for example, a name of a singer, the display unit 160 may display an icon indicating that the type of the list is one of singer names. When the music information search result is a music title, the display unit 160 may display an icon indicating that the type of the list is one of music titles.

Also, when displaying the music information search result, the display unit 160 may highlight and display a part corresponding to a speech query inputted from the user. Specifically, for example, when "I love you" is inputted from the user as the speech query, the display unit 160 may display a part of "I love you" through processing by a different color, an underline, or a deeper color.

As described above, the music search apparatus according to an embodiment of the present invention may search for a desired music by recognizing a part or an entire utterance such as a music title, a name of a singer, and a name of an album via a process of partial symbol matching between a recognized phoneme sequence and a standard pronunciation sequence by a phoneme decoder.

Figure 2:
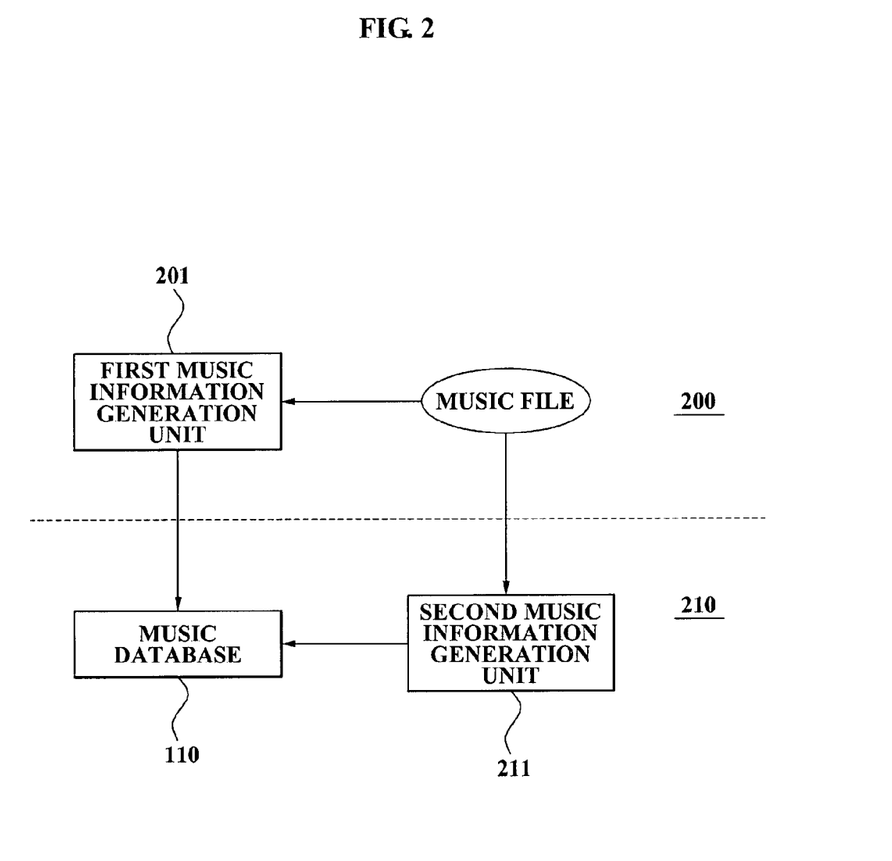
FIG. 2 is a diagram illustrating an example of a music information generation unit includable the music search apparatus of FIG. 1, illustrated in the context of a music delivery system.

FIG. 2 is a diagram illustrating an example of a music information generation unit includable in the music search apparatus of FIG. 1, illustrated in the context of a music delivery system.

Referring to FIG. 2, a music providing server 200 includes a music content providing server or a computer for storing music downloaded from the music content providing server. A first music information generation unit 201 generates various kinds of music information associated with a music file stored in the music content providing server or the computer by using the music file. When the music file is an MP3 file, the music information may be data associated with the MP3 file such as a music title, a name of a singer, and a name of an album, recorded in an IP3 tag of the MP3 file.

Also, when the music file does not include music information, the first music information generation unit 201 may generate the music information by analyzing the music file. Further, the first music information generation unit 201 generates a lexicon with respect to each recognition target vocabulary and may arrange the generated lexicon to improve a match speed with respect to total vocabularies.

Conversely, a portable device 210 downloads a music file, music information with respect to the music file, and a lexicon from the music providing server 200. Specifically, the music database 110 stores the downloaded music file, music information with respect to the music file, and lexicon.

When the music information of the music file downloaded from the music providing server 200 does not exist, a second music information generation unit 211 generates music information by analyzing the downloaded music file.

When the lexicon with respect to the music file downloaded from the music providing server 200 does not exist, the second music information generation unit 211 generates a lexicon with respect to each recognition target vocabulary in the portable device 210, and sorts the lexicon so that the match speed improves with respect to all of the total vocabularies.

In addition, the second music information generation unit 211 may operate at an instant of time when the portable device 210 downloads the music file and may generate the lexicon with respect to the music information when a speech recognition button is operated by the user.

Accordingly, the portable device 210 may store the music information and the lexicon generated by the first music information generation unit 201 or the second music information generation unit 211 in the music database 110.

FIG. 3 is a diagram illustrating an example of a match of a reference pattern and a recognized symbol sequence by the matching unit 140 of the music search apparatus of FIG. 1.

Referring to FIGS. 1 and 3, a horizontal axis shows "s ya r a 0 e" that is a phonetic value of Korean corresponding to "love ya" as an example of a recognized symbol sequence that is an output of the phoneme decoding unit 130, and a vertical axis shows "n v L s a r a 0 h E" that is a phonetic value of Korean corresponding to "I love you" as an example of a reference pattern of a lexicon.

The music search apparatus according to an embodiment of the present invention first matches "s a r a 0 h E" with the recognized symbol sequence because a part of "n v L" in the reference pattern is not matched with the recognized symbol sequence.

Figure 4:
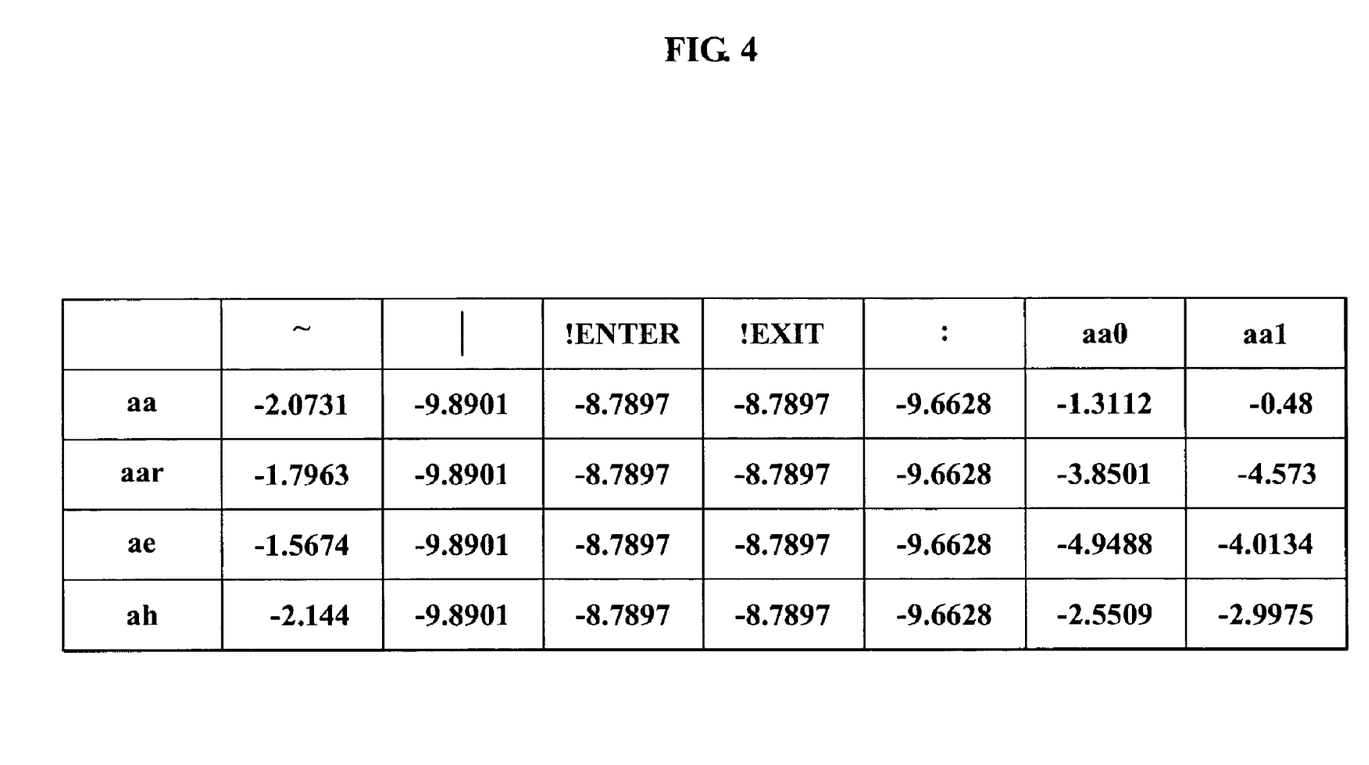
FIG. 4 is a diagram illustrating an example of a phoneme confusion matrix usable by the matching unit of the music search apparatus of FIG. 1.

FIG. 4 is a diagram illustrating an example of a phoneme confusion matrix usable by the matching unit 140 of the music search apparatus of FIG. 1.

Referring to FIGS. 1 and 4, the phoneme confusion matrix shows confusion between a recognized symbol and a reference symbol as a probability value by using an insertion probability value with respect to the recognized symbol, and a deletion probability value with respect to the reference symbol. The value of the phoneme confusion matrix may be shown as log P (a|b).

A recognized symbol set is a phoneme set used by the phoneme decoding unit 130 and a reference symbol set is a phoneme set used for lexicon representation. The recognized symbol set may be identical with the reference symbol set or may be different from the reference symbol set.

FIG. 5 is a diagram illustrating an example of the display of a music information search result by the display unit of the music search apparatus of FIG. 1.

Referring to FIGS. 1 and 5, the music search apparatus receives a speech query such as "love you" from a user, recognizes the speech query by phoneme, matches the speech query with reference patterns of a lexicon stored in the music database 110, and displays a music information search result whose match score is greater than a predetermined reference value according to the match score.

Figure 6:
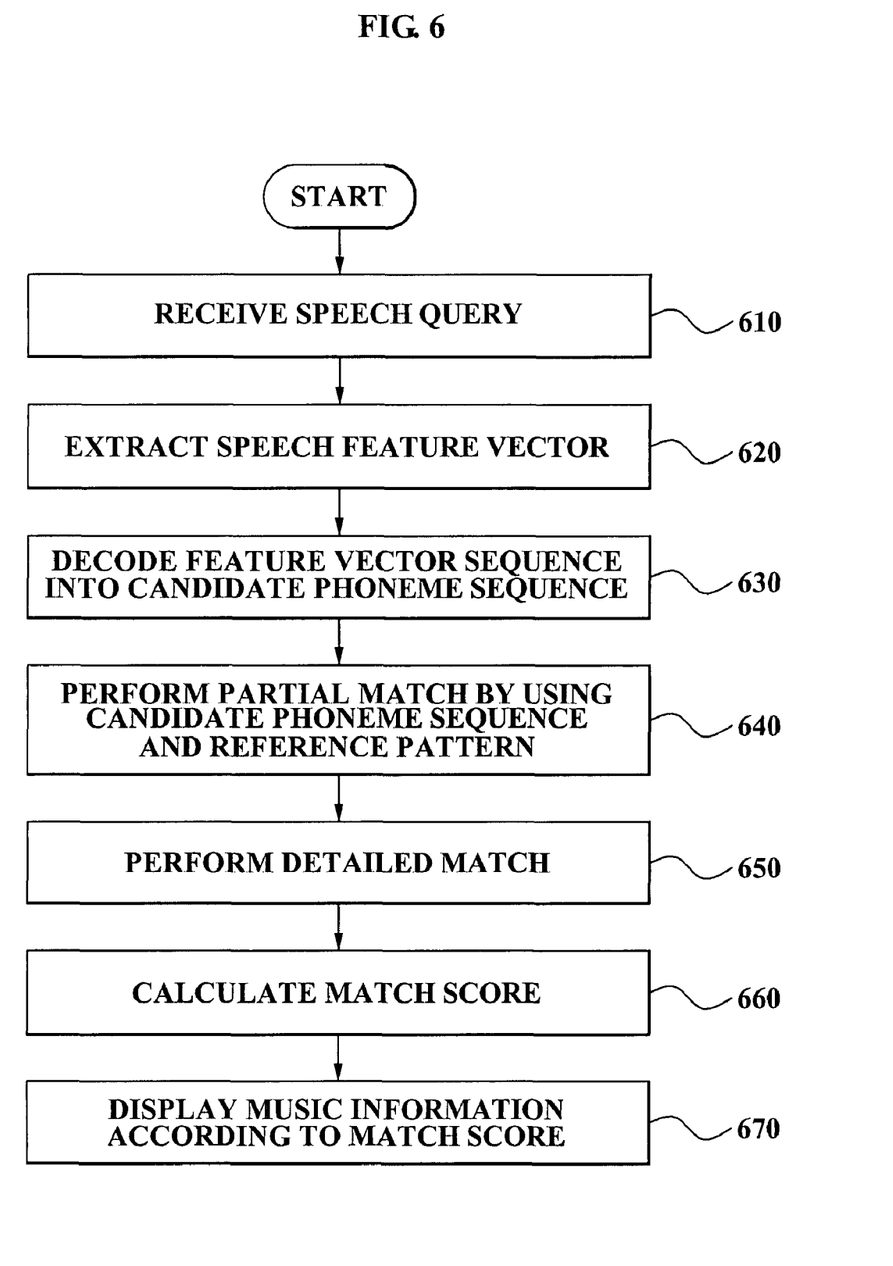
FIG. 6 is a flowchart illustrating a music search method according to an embodiment of the present invention.

FIG. 6 is a flowchart illustrating a music search method according to an embodiment of the present invention.

Referring to FIGS. 1 and 6, in operation 610, a portable device receives a speech query from a user. Specifically, in operation 610, when the user searches for a music title including, for example, "love you", the portable device may receive a speech signal "love you" spoken by the user as the speech query.

In operation 620, the portable device extracts a speech feature vector from the inputted speech query. Specifically, in operation 620, the portable device reduces background noise with respect to the inputted speech signal, detects a speech interval from the speech signal, and extracts the speech feature vector that will be used in speech recognition from the detected speech interval.

In operation 630, the portable device decodes the extracted speech feature vector sequence into candidate phoneme sequences. Specifically, in operation 630, the portable device decodes the extracted speech feature vector sequence to N candidate phoneme sequences by using a phoneme or a tri-phoneme acoustic model by a phoneme decoder.

In operation 640, the portable device performs a partial matching by using the candidate phoneme sequences and reference patterns of a lexicon stored in a music database. Specifically, in operation 640, the portable device partially matches the recognized candidate phoneme sequences with the reference patterns by a phoneme confusion matrix and linguistic constraints, as shown in FIG. 3.

A music providing server that is a music storage site such as ITUNES® or a music download site such as YEPP® studio includes a music information generation module as an element. The music information generation module of the music providing server extracts information of a recognition target vocabulary such as a music title, a name of a singer, a name of an album, a name of folder, a playlist, and a genre from a music file, and music information such as an index or type with respect to the recognition target vocabulary by using the extracted information. The music providing server may transmit or download the generated music information to the portable device.

Conversely, the portable device may extract music information included in a music file by operating a built-in music information generation module at an instant of time when downloading the music file, or may generate music information with respect to a music file stored in the music database by analyzing the music file. Also, the portable device may download the music file and the music information with respect to the music file from the music providing server and may store the music file and the music information in the music database. Specifically, the portable device extracts a recognition target vocabulary with respect to the music file by the music information generation module and generates the music information such as an index or type of the extracted recognition target vocabulary. Further, the portable device may generate a lexicon with respect to each of the recognition target vocabulary and may sort the lexicon to improve a match speed with respect to the total recognition target vocabulary.

In operation 650, the portable device performs a detailed match by Viterbi alignment with respect to a matched phoneme segment of a candidate recognition list obtained from the partial matching. In operation 650, the portable device performs the detailed match after converting a pronunciation sequence of a part of the candidate phoneme sequence exhibiting an effect of palatalization into a pronunciation sequence in an isolated speech form.

In operation 660, the portable device calculates a match score according to the performed matching result. Specifically, in operation 660, the portable device calculates the match score by using the phoneme confusion matrix according to the performed matching result. The match score may be calculated by using a probability value of the phoneme confusion matrix, and by considering probability values of insertion or deletion of a phoneme.

In operation 670, the portable device displays a music information search result via a display unit according to the calculated match score. Specifically, in operation 670, the portable device may search a list of candidates whose match score calculated by the partial symbol matching between the recognized phoneme sequence and the standard pronunciation sequence is high, and may display the music information search result via the display unit according to an order of the candidates having a high match score.

In operation 670, the portable device may display only music information search results whose calculated match score is greater than a predetermined reference value via the display unit.

Also, in operation 670, when the match scores of music information search results are the same, the portable device sorts the music information search results according to a predetermined priority to display via the display unit 160. The priority may be a condition such as a type of a list, longest coincidence, and left-side coincidence. When the priority is of the type of the list, an order of a music title, a name of an album, a name of a singer, and music information may be determined by the user or by the portable device itself.

Also, the portable device may show the music information search result by a different icon according to the type for each list. Specifically, in operation 670, when the music information search result is a name of a singer, the portable device may show an icon indicating that the type of the list is one of singer names. Also, when the music information search result is a music title, an icon indicating that the type of the list is one of titles.

Also, in operation 670, when displaying the music information search result, the display unit 160 may highlight and display a part corresponding to a speech query inputted from the user. Specifically, for example, when "I love you" is inputted from the user as the speech query, the display unit 160 may display a part of "I love you" through processing by a different color, an underline, or a deeper color.

The music search method according to the above-described embodiment of the present invention may search for a desired music by recognizing a part or an entire utterance of information such as a music title, a name of a singer, and a name of an album via a process of partial symbol matching between a recognized phoneme sequence and a standard pronunciation sequence by a phoneme decoder in the portable device.

As described above, the method and apparatus for searching music by speech recognition in the portable device have been described as an embodiment of the present invention. However, the present invention is not limited to only music search. The present invention may be applied to search with respect to multimedia data such as images or moving pictures, stored in the portable device, via the speech recognition in the portable device. For example, in the case of the images or moving pictures, a name of file can be used as a search query that is applied to speech recognition.

Embodiments of the present invention include program instruction capable of being executed via various computer units and may be recorded in a computer-readable recording medium. The computer-readable medium may include a program instruction, a data file, and a data structure, separately or cooperatively. The program instructions and the media may be those specially designed and constructed for the purposes of the present invention, or they may be of the kind well-known and available to those skilled in the art of computer software arts. Examples of the computer-readable media include magnetic media (e.g., hard disks, floppy disks, and magnetic tapes), optical media (e.g., CD-ROMs or DVD), magneto-optical media (e.g., optical disks), and hardware devices (e.g., ROMs, RAMs, or flash memories, etc.) that are specially configured to store and perform program instructions. Examples of the program instructions include both machine code, such as produced by a compiler, and files containing high-level language codes that may be executed by the computer using an interpreter. The hardware elements above may be configured to act as one or more software modules for implementing the operations of this invention.

According to the above-described embodiments of the present invention, in a method and apparatus for searching multimedia data, multimedia data, such as music in a mobile device, is searched by recognizing a part or an entire utterance of a music title, a name of a singer, and a name of an album via a partial symbol matching between a recognized phoneme sequence and a standard pronunciation sequence.

The above-described embodiments of the present invention also provide a music information search method and apparatus capable of performing a function of converting music information used in speech recognition from a program list in a site for storing or downloading music, or in a mobile device itself.

The above-described embodiments of the present invention also provide a music information search method and apparatus capable of increasing precision of a match by applying linguistic constraints via a partial symbol matching process.

The above-described embodiments of the present invention also provide a music information search method and apparatus searching for a partial match score and a matched part between a phoneme recognition result and a vocabulary pronunciation sequence by using a phoneme confusion matrix.

The above-described embodiments of the present invention provide the following advantages: since it is not required to extract a name of a partial individual by previously analyzing a search target vocabulary list in a portable device, a net for searching vocabulary is not required; since language/application expandability in a portable device is high, various languages and applications may be used; and since a speech signal inputted as a query is recognized by a phoneme sequence instead of being recognized by vocabulary, though a number of recognized vocabularies is increased, an increase of memory is small.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

What is claimed is:

1. A method of searching music using speech recognition, the method comprising:
   recognizing as a phoneme sequence a speech signal uttered by a user; and
   searching music information by performing partial symbol matching between the recognized phoneme sequence and a standard pronunciation sequence, considering pronunciation differences between a pronunciation of—sequenced partial symbols in the standard pronunciation sequence—and a pronunciation of a single partial symbol within the sequenced partial symbols or a pronunciation of a sequence of partial symbols less than all of the sequenced partial symbols within the sequenced partial symbols,
   wherein the recognizing comprises:
   extracting a feature vector sequence of the speech signal uttered by the user; and
   converting the extracted feature vector sequence to the phoneme sequence, so that the speech signal is recognized as the phoneme sequence.

2. The method of claim 1, wherein the searching music information comprises:
   calculating a match score according to a result of the partial symbol matching; and
   displaying a music information search result according to the match score.

3. The method of claim 2, wherein the match score is calculated by a phoneme confusion matrix.

4. The method of claim 2, wherein, in the displaying a music information search result according to the match score, only a music information search result having the match score greater than a predetermined reference value is displayed.

5. The method of claim 1, further comprising extracting a recognition target vocabulary from a predetermined music file and generating the music information with respect to the extracted recognition target vocabulary.

6. The method of claim 5, further comprising:
   generating a pronunciation dictionary with the recognition target vocabulary; and
   sorting the generated pronunciation dictionary.

7. A non-transitory computer-readable recording medium in which a program to execute a method of searching music using speech recognition is recorded, the method comprising:
   recognizing as a phoneme sequence a speech signal uttered by a user; and
   searching music information by performing partial symbol matching between the recognized phoneme sequence and a standard pronunciation sequence, using a phoneme confusion matrix based on pronunciation differences between a pronunciation of sequenced partial symbols in the standard pronunciation sequence—and a pronunciation of a single partial symbol within the sequenced partial symbols or a pronunciation of a sequence of partial symbols less than all of the sequenced partial symbols within the sequenced partial symbol,
   wherein the recognizing comprises:
   extracting a feature vector sequence of the speech signal uttered by the user; and
   converting the extracted feature vector sequence to the phoneme sequence, so that the speech signal is recognized as the phoneme sequence.

8. A music search apparatus comprising:
   a music database storing a pronunciation dictionary with respect to music and music information;
   a feature extraction unit extracting a feature vector sequence from a speech signal;
   a phoneme decoding unit decoding the feature vector sequence into a candidate phoneme sequence;
   a matching unit matching the candidate phoneme sequence with a reference phoneme pattern in the pronunciation dictionary with respect to the music information, with the pronunciation dictionary relating pronunciation differences between a pronunciation of sequenced partial symbols and a pronunciation of a single partial symbol within the sequenced partial symbols or a pronunciation of a sequence of partial symbols less than all of the sequenced partial symbols within the sequenced partial
   a calculation unit calculating a match score according to a result of the matching; and
   a display unit displaying a music information search result according to the calculated match score.

9. The apparatus of claim 8, wherein the matching unit matches the candidate phoneme sequence with the reference phoneme pattern in the pronunciation dictionary, with respect to the music information, using a phoneme confusion matrix and language boundary information.

10. The apparatus of claim 8, wherein the display unit displays only music information search results having the match score greater than a predetermined reference value.

11. The apparatus of claim 8, wherein the display unit arranges and displays music information search results according to a predetermined criteria when the match score of the music information search result is the same as another match score of another search.

12. The apparatus of claim 8, further comprising a music information generation unit extracting a recognition target vocabulary from a predetermined music file, and generating the music information with respect to the extracted recognition target vocabulary.

13. The apparatus of claim 8, wherein the matching unit converts a pronunciation sequence of a part of the candidate phoneme sequence exhibiting an effect of palatalization into an original pronunciation sequence in an isolated speech form and matches the converted pronunciation sequence with the reference phoneme pattern of the pronunciation dictionary.

14. A music search apparatus comprising:
   a music database storing a pronunciation dictionary with respect to music and music information;
   a phoneme decoding unit decoding a speech signal into a candidate phoneme sequence;
   a matching unit matching the candidate phoneme sequence with a reference phoneme pattern in the pronunciation dictionary with respect to the music information;
   a calculation unit calculating a match score according to a result of the matching; and
   a display unit displaying a music information search result according to the calculated match score,
   wherein the matching unit converts a pronunciation sequence of a part of the candidate phoneme sequence exhibiting an effect of palatalization into an original pronunciation sequence in an isolated speech form and matches the converted pronunciation sequence with the reference phoneme pattern of the pronunciation dictionary.

15. A music search apparatus comprising:
a feature extraction unit extracting a feature vector sequence of a speech signal of an input speech query;
a phoneme decoding unit decoding the extracted feature vector sequence into at least one candidate phoneme sequences;
a matching unit partially matching a candidate phoneme sequence with a reference pattern included in a stored lexicon by matching the candidate phoneme sequence with the reference pattern using a phoneme confusion matrix and linguistic constraints and, after the partial matching, matching a converted pronunciation sequence with a reference phoneme pattern of the lexicon so as to overcome an inconsistency due to a difference in pronunciation caused by palatalization; and
a calculation unit calculating a match score according to the match score using a probability value of the phoneme confusion matrix and considering probabilities of insertion and deletion of the phoneme.

16. The apparatus of claim 15, further comprising a music database storing music, music information, and the lexicon, the lexicon being for the music information and corresponding to a reference pronunciation pattern for comparing a speech query with a recognized phoneme sequence.

17. The apparatus of claim 15, wherein the feature extraction unit extracts a feature vector sequence of a speech signal of an input speech query by reducing background noise of the speech signal of the speech query, extracting a speech interval from the speech signal, and extracting a feature vector sequence usable in speech recognition from the detected speech interval.

18. The apparatus of claim 15, wherein the phoneme decoding unit decodes the extracted feature vector sequence into the at least one candidate phoneme sequence using a phoneme or a tri-phoneme acoustic model and applies connectivity between contexts when using the tri-phoneme acoustic model.

19. The apparatus of claim 15, wherein the phoneme decoding unit applies a phoneme-level grammar when converting the extracted feature vector sequence into the at least one candidate phoneme sequence.

20. The apparatus of claim 15, wherein the matching unit obtains the converted pronunciation sequence used to overcome an inconsistency due to a difference in pronunciation caused by palatalization by converting a pronunciation sequence of a part of the candidate phoneme sequence exhibiting an effect of palatalization into an original pronunciation sequence in an isolated speech form.

21. The apparatus of claim 15, wherein the conversion of the pronunciation sequence into the original pronunciation sequence enables regularization by back-tracking from a pronunciation rule.

22. The apparatus of claim 15, wherein the matching a converted pronunciation sequence with a reference phoneme pattern of the lexicon is achieved by Viterbi alignment with respect to a matched phoneme segment of a candidate recognition list obtained from the partial matching.

* * * * *

UNITED STATES PATENT AND TRADEMARK OFFICE
CERTIFICATE OF CORRECTION

PATENT NO. : 8,200,490 B2
APPLICATION NO. : 11/704271
DATED : June 12, 2012
INVENTOR(S) : In Jeong Choi et al.

Page 1 of 1

It is certified that error appears in the above-identified patent and that said Letters Patent is hereby corrected as shown below:

First Page Column 1 (Inventors), Line 2, delete "Sano" and insert -- Sang --, therefor.

Column 9, Line 22, In Claim 1, delete "of–" and insert -- of --, therefor.

Column 9, Line 24, In Claim 1, delete "sequence–" and insert -- sequence --, therefor.

Column 9, Line 65, In Claim 7, delete "sequence–" and insert -- sequence --, therefor.

Column 10, Line 25, In Claim 8, after "partial" insert -- symbol; --.

Signed and Sealed this
Twenty-eighth Day of August, 2012

David J. Kappos
*Director of the United States Patent and Trademark Office*